United States Patent
Birsching et al.

(10) Patent No.: US 6,378,647 B1
(45) Date of Patent: Apr. 30, 2002

(54) ELECTRIC POWER STEERING ASSIST MECHANISM WITH ISOLATED OUTPUT SHAFT

(75) Inventors: Joel Edward Birsching, Unionville, MI (US); Eric David Pattok, Wiesbaden (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/669,616

(22) Filed: Sep. 26, 2000

(51) Int. Cl.[7] .................................................. B62D 5/04
(52) U.S. Cl. ...................... 180/444; 74/388 PS; 74/425
(58) Field of Search ................................. 180/444, 443, 180/446; 74/425, 388 PS, 574; 464/89

(56) References Cited

U.S. PATENT DOCUMENTS

| | | | | |
|---|---|---|---|---|
| 2,307,129 A | * | 1/1943 | Hines et al. | |
| 5,010,970 A | * | 4/1991 | Yamamoto | |
| 5,445,237 A | * | 8/1995 | Eda et al. | |
| 5,819,871 A | * | 10/1998 | Takaoka | |
| 5,878,832 A | * | 3/1999 | Olgren et al. | |
| 5,927,149 A | * | 7/1999 | Moody | |
| 6,044,723 A | * | 4/2000 | Eda et al. | |
| 6,170,349 B1 | * | 1/2001 | Tanaka et al. | |
| 6,183,230 B1 | * | 2/2001 | Beardmore et al. | |

* cited by examiner

Primary Examiner—Anne Marie Boehler
(74) Attorney, Agent, or Firm—Edmund P. Anderson

(57) ABSTRACT

An electric power steering assist mechanism with an isolated output shaft for a motor vehicle. An output shaft has a steering hand wheel disposed on an upper end and has an opposing lower end ultimately operably connected to the steerable wheels of the motor vehicle. The output shaft is concentrically received and rotatably supported within a tubular speed reducing gear, which is driven by a worm gear connected to an electric motor. An elastomeric isolator is disposed within an annular space between the speed reducing gear and the output shaft to provide compliance in the steering assist mechanism between the gears and the output shaft thereby reducing vibrations.

5 Claims, 3 Drawing Sheets

ELECTRIC POWER STEERING ASSIST MECHANISM WITH ISOLATED OUTPUT SHAFT

TECHNICAL FIELD

This invention relates to an electric power steering assist mechanism, and, more particularly, to an electric power steering assist mechanism having an isolated output shaft.

BACKGROUND OF THE INVENTION

In a typical electric power steering assist mechanism, a reduction gear set applies steering assist to the output shaft in the column. The output shaft comprises an upper shaft and a lower shaft connected by a torsion bar. The upper shaft connects to the steering wheel of the vehicle, and the lower shaft connects to an intermediate shaft that ultimately connects to the rack and pinion gear of the vehicle. The reduction gear is rigidly attached to the lower shaft and is powered by a motor that applies the steering assist to the output shaft. A sensor measures the angular displacement between the upper and lower shafts when torque is applied and the shafts are axially rotated.

Clearances are minimized in the reduction gear mesh, the rack and pinion gear mesh, and the intermediate shaft joints to minimize vibration. Such is typically accomplished with precision components, generally much greater precision than is typically required in order to maintain the minimal clearance and still allow for the rotation of other such components at low friction levels. Further, such has also been accomplished by the addition of compliance in the intermediate shaft. This compliance is introduced by the addition of a torsional isolator. The torsional isolator allows the intermediate shaft and the rack and pinion to move without having to overcome the inertia and friction associated with the motor and the reduction gear set. This significantly reduces the torque across the reduction gear mesh, the rack and pinion gear mesh, and the intermediate shaft joints.

One particular use of a torsional isolator is disclosed in U.S. Pat. No. 5,878,832 entitled "Steering Apparatus for Motor Vehicle", which includes a torsional isolating means comprising a plurality of vibration isolators mounted between a speed reducing gear set and a motor. In this design, only the inertia of the motor is isolated, and the inertia of the gear set remains.

Another use of a torsional isolator involves positioning similar vibrational isolators axially on opposing ends of the worm gear. In this design, still only the inertia of the motor is isolated. Moreover, since the worm gear slides within the bearings located on both ends of the worm gear, additional vibrational interfaces exist.

A design is needed in which the compliance is applied as far downstream in the assist circuit as possible so as to isolate as many vibration points with the compliance means as possible. At the same time, the stiffness between the as driver and the wheels resulting from the compliance means must be minimized. Such a design would require the isolation of both the motor and the gear set. The optimum location for implementing such a design is between the output gear and the output shaft.

SUMMARY OF THE INVENTION

An electric power steering assist mechanism for a motor vehicle comprises a speed reducing gear, an output shaft rotatably supported within the speed reducing gear, an isolator disposed between the speed reducing gear and the output shaft, and an electric motor connected to the speed reducing gear to assist in driving the speed reducing gear. An upper end of the output shaft has a steering hand wheel attached to it, and a lower end of the output shaft attaches to an intermediate shaft that connects to rack and pinion gears that ultimately steer the wheels of the motor vehicle. An isolator is positioned between the speed reducing gear and the output shaft to separate the speed reducing gear and the output shaft and to add compliance to the steering assist mechanism. A worm gear is typically used to transfer torque from a driveshaft of an electric motor to the speed reducing gear thereby driving the speed reducing gear.

The speed reducing gear is generally tubular in structure and contains a plurality of ridges that project perpendicularly from the inner surface of the tubular structure and extend longitudinally along the tubular surface. The outer surface of the output shaft likewise contains a plurality of ridges that project perpendicularly from the outer surface and extend longitudinally along the length of the output shaft. The isolator, typically of an elastomeric chemical structure, is disposed in the annular space between the speed reducing gear and the output shaft and provides the requisite compliance to the steering system to minimize vibration.

BRIEF DESCRIPTION OF THE DRAWINGS

The present invention will now be described, by way of example, with reference to the accompanying drawings, in which.

DETAILED DESCRIPTION OF THE INVENTION

Figure 1:
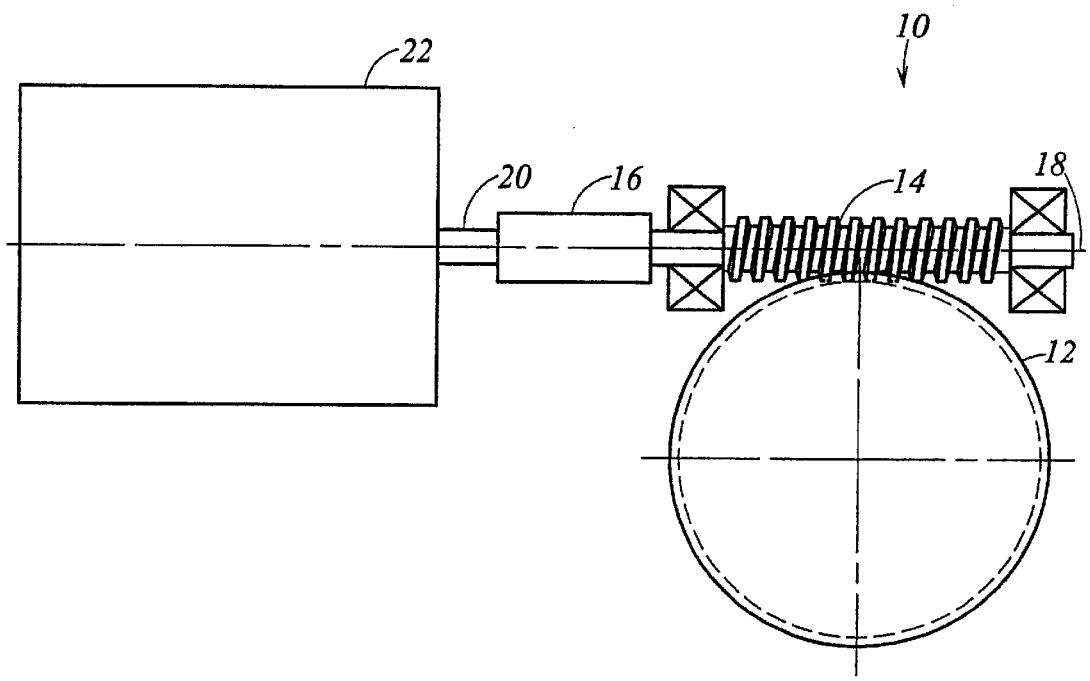
FIG. 1 is a schematic view of an electric power steering assist mechanism of the prior art.

Referring to FIG. 1, an electric power steering assist mechanism of the prior art is generally shown at 10. Prior art steering assist mechanism 10 comprises a worm wheel 12 operably engaged by a worm gear 14 positioned substantially tangentially to worm wheel 12. Worm wheel 12 is fixedly connected to a torsional isolator 16 of the prior art along a longitudinal axis 18 of worm gear 14. Torsional isolator 16 of the prior art is subsequently axially connected to a driveshaft 20 of a motor 22. As stated above, torsional isolator 16 of the prior art isolates only motor 22 from vibrations, while worm gear 14 and worm wheel 12 remain subject to vibrations.

Figure 2:
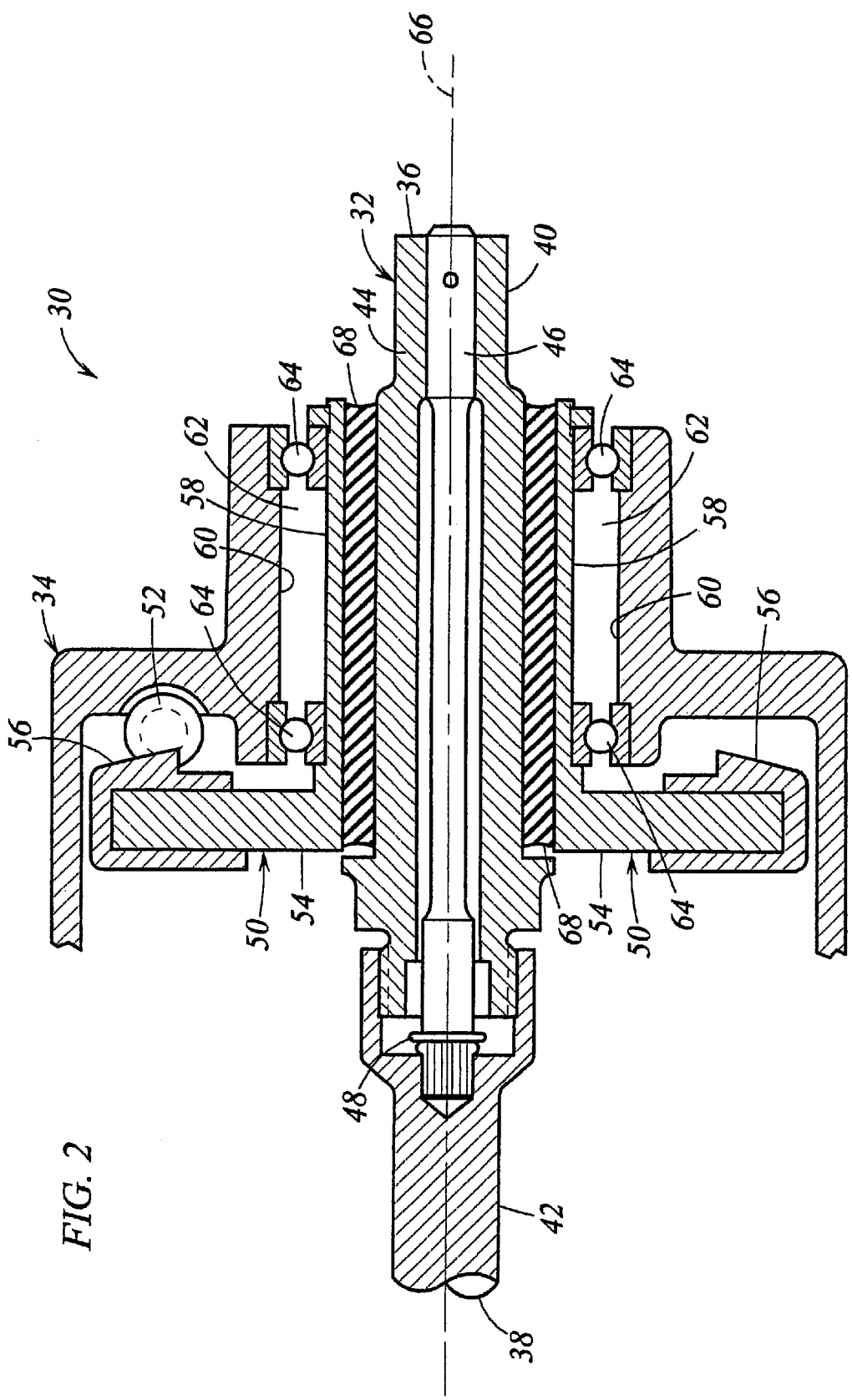
FIG. 2 is an elevated cutaway view of an electric power steering assist mechanism illustrating the isolated output shaft, of the present invention.

Referring to FIG. 2, an electric power steering assist mechanism of the present invention is shown generally at 30. Steering assist mechanism 30 comprises an output shaft generally shown at 32 axially mounted inside a speed reducer housing generally shown at 34, an electric motor (not shown), a speed reducing gear shown generally at 50, and a worm gear 52. A first end 36 of output shaft 32 is ultimately connected to a rack and pinion gear (not shown) of a motor vehicle (not shown), and a second end 38 of output shaft 32 is ultimately connected to the steering hand wheel (not shown) of the motor vehicle. Output shaft 32 comprises a lower steering shaft 40 and an upper steering shaft 42. Lower steering shaft 40 comprises a tubular outer shaft 44 and a torsion bar 46 fixedly disposed within tubular outer shaft 44 and extending out an end of tubular outer shaft 44 proximate upper steering shaft 42. Torsion bar 46 is attached to one end of upper steering shaft 42 with a pin 48 thus connecting lower steering shaft 40 and upper steering shaft 42.

The electric motor and speed reducing gear 50 are operably connected by worm gear 52. Speed reducing gear 50 is typically cylindrical in structure and contains a flange 54 on one end, which contains threads 56 on one side or an edge precision-machined to mate with the threads (not shown) of worm gear 52. Speed reducing gear 50 is mounted inside speed reducer housing 34 such that an outer cylindrical portion 58 of speed reducing gear 50 extends parallel to an inner portion 60 of speed reducer housing 34 to define an annular space 62. A pair of ball bearings 64 in annular space 62 supports speed reducing gear 50 on inner portion 60 of speed reducer housing 34 with great precision for rotation about a longitudinal centerline 66 of steering assist mechanism 30.

Output shaft 32 is positioned concentrically through the tubular space defined by speed reducing gear 50 mounted inside speed reducer housing 34. An elastomeric isolator 68 is disposed within the annular space formed between an outer surface of output shaft 32 and speed reducing gear 50 to provide compliance between output shaft 32 and speed reducing gear 50 and to isolate output shaft 32 from speed reducing gear 50. Elastomeric isolator 68 has the effect of reducing the torque across interfaces within steering assist mechanism 30 by providing a "cushion" to smooth out bumps that the motor vehicle experiences which generate vibrations .

Figure 3:
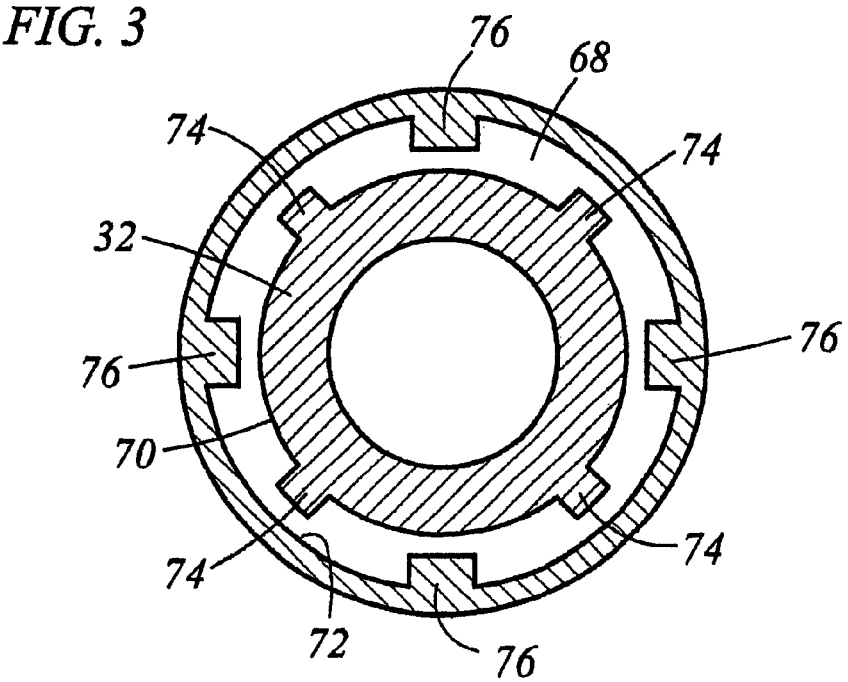
FIG. 3 is a front elevated cross sectional view of the isolated output shaft, of the present invention.

Referring now to FIG. 3, the isolated output shaft 32 is shown in greater detail. Elastomeric isolator 68 is bonded concentrically to either an outer surface 70 of isolated output shaft 32 or to an inner surface 72 of speed reducing gear 50. Bonding elastomeric isolator 68 to either surface provides an easy method of generating isolators of different torsional rates by varying the length elastomeric isolator 68 extends along output shaft 32.

The cross section of isolated output shaft 32 disposed within speed reducing gear 50 incorporates a block-tooth geometry in which a first set of ridges 74 extend longitudinally along outer surface 70 of isolated output shaft 32, and a second set of ridges 76 extend longitudinally along inner surface 72 of speed reducing gear 50. During steering operations, first set of ridges 74 on isolated output shaft 32 move toward second set of ridges 76 on speed reducing gear 50. Elastomeric isolator 68 is thus compressed between the sides of ridges 74, 76, thereby resulting in the minimization of the shearing of elastomeric isolator 68 between output shaft 32 and speed reducing gear 50. Utilizing this or a similar geometry to maximize compressive forces and minimize shearing forces improves the life of elastomeric isolator 68.

Figure 4:
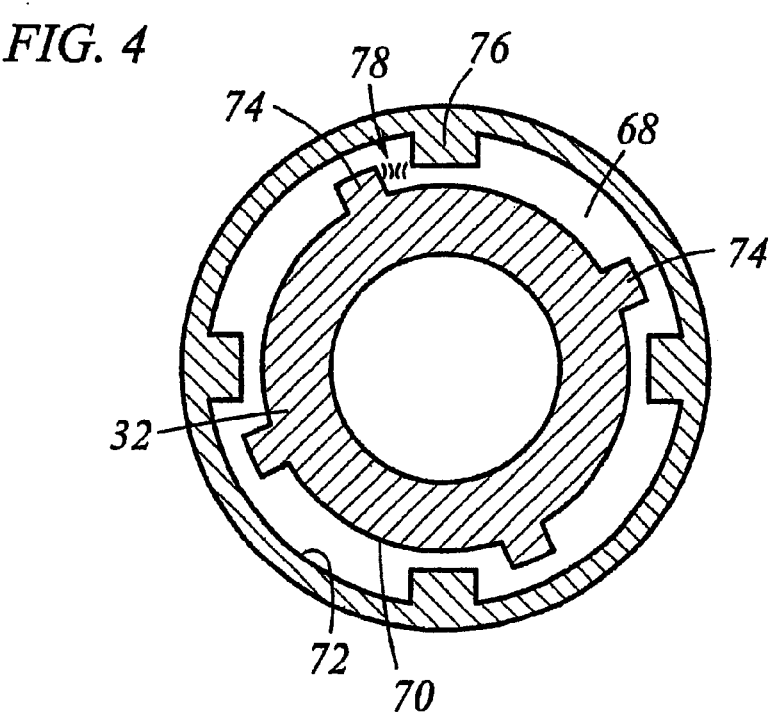
FIG. 4 is a front elevated cross sectional view of the isolated output shaft, of the present invention, as it is being rotated to cause a compression in the elastomeric isolator.

In FIG. 4, isolated output shaft 32 is shown being rotated in a clockwise direction. During rotation, first set of ridges 74 approaches second set of ridges 76. A compression in elastomeric isolator 68, shown generally at 78, results between each individual ridge of first set of ridges 74 and its corresponding ridge of second set of ridges 76. As isolated output shaft 32 is rotated through an increasingly larger angle, compression 78 of elastomeric isolator 68 increases thus resulting in increased resistance to rotation.

While this invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electric power steering assist mechanism for a motor vehicle comprising:

a speed reducing gear comprising,
  a sleeve portion, and
  a flange disposed at one end of said sleeve portion;
an output shaft rotatably supported concentrically within and extending through said sleeve portion of said speed reducing gear, said output shaft being configured at an upper end of said output shaft for communicating with a steering hand wheel and configured at a lower end of said output shaft for communicating with at least one wheel of said motor vehicle to steer said motor vehicle;
an isolator disposed between said speed reducing gear and said output shaft and in contact with an inner surface of said sleeve portion of said speed reducing gear and an outer surface of said output shaft, thereby separating said speed reducing gear and said output shaft and imparting a compliance factor between said speed reducing gear and said output shaft; and
an electric motor having a driveshaft operably connected to said speed reducing gear at said flange and configured to drive said speed reducing gear.

2. The electric power steering assist mechanism of claim 1 wherein said driveshaft of said electric motor drives a worm gear which drives said speed reducing gear.

3. The electric power steerng assist mechanism of claim 1 wherein an inner tubular surface of said speed reducing gear includes ridges projecting substantially perpendicularly from said inner tubular surface of said speed reducing gear and extending along a longitudinal axis of said speed reducing gear.

4. The electric power steering assist mechanism of claim 1 wherein said output shaft includes ridges projecting substantially perpendicularly from an outer surface of said output shaft and extending along a longitudinal axis of said output shaft.

5. The electric power steering assist mechanism of claim 1 wherein said isolator is an elastomeric substance.

* * * * *